April 29, 1952  J. D. HEIBEL  2,595,194
VARIABLE CONDENSER
Filed March 18, 1950  2 SHEETS—SHEET 1

INVENTOR.
Jerome D. Heibel
BY Ralph Hammar
Attorney

April 29, 1952 J. D. HEIBEL 2,595,194
VARIABLE CONDENSER
Filed March 18, 1950 2 SHEETS—SHEET 2
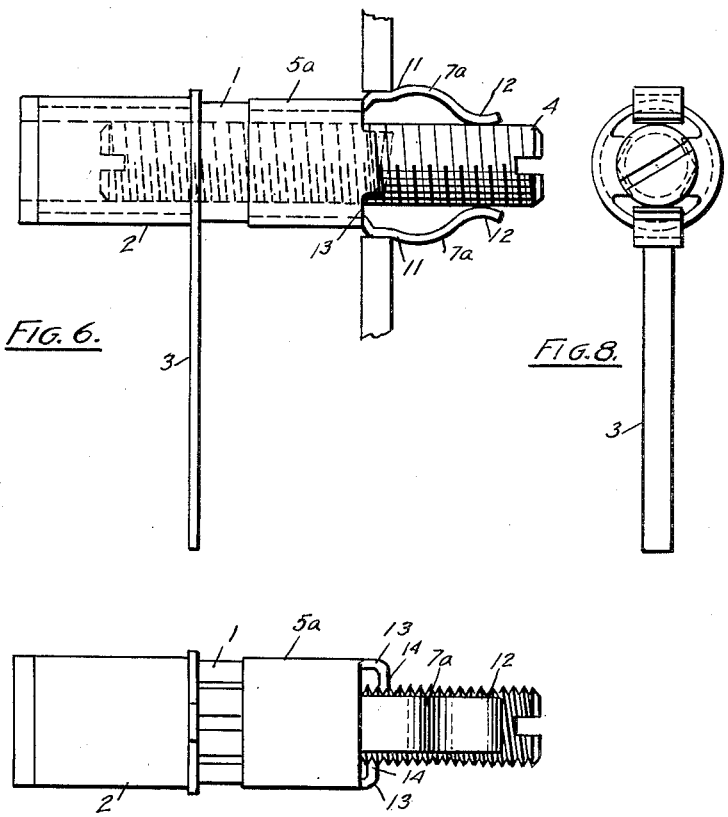
INVENTOR.
Jerome D Heibel
BY Ralph Hammar
Attorney Patented Apr. 29, 1952

2,595,194

UNITED STATES PATENT OFFICE 2,595,194

VARIABLE CONDENSER

Jerome D. Heibel, Erie, Pa., assignor to Erie Resistor Corporation, Erie, Pa., a corporation of Pennsylvania Application March 18, 1950, Serial No. 150,469

1 Claim. (Cl. 175—41.5)

This invention is intended to produce a trimmer condenser or similar device in which the adjusting screw for the device also serves to fasten the device to its support. Further objects and advantages appear in the specification and claim.

Figure 1:
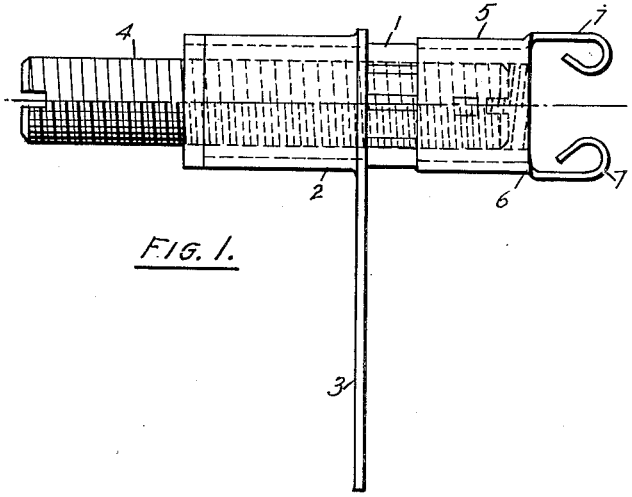
Figure 2:
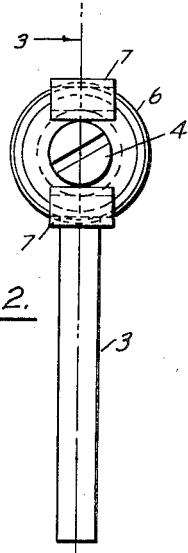
Figure 3:
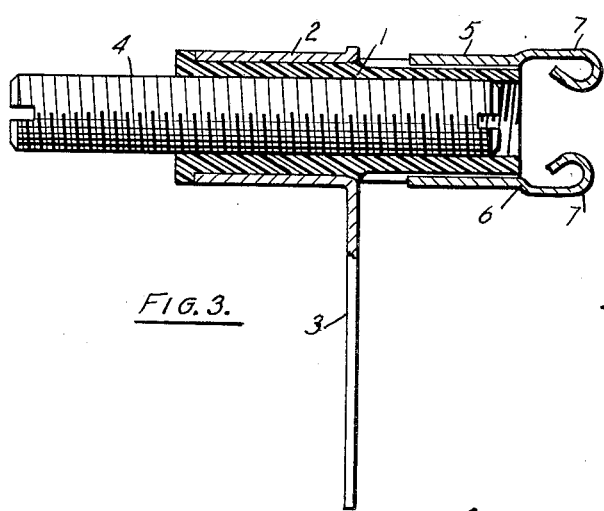
Figure 4:
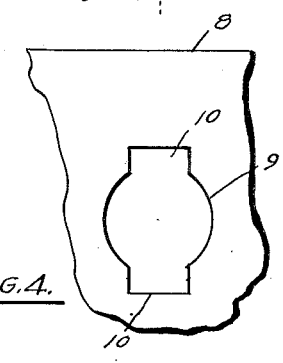
Figure 5:
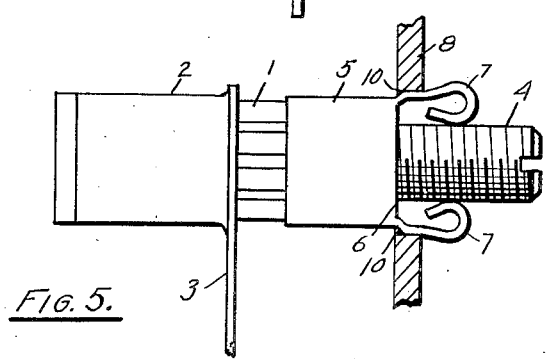

In the drawing, Fig. 1 is a side view of a trimmer condenser ready for mounting, Fig. 2 is an end view, Fig. 3 is a longitudinal section, Fig. 4 is a fragmentary view of the panel on which the condenser is to be mounted, Fig. 5 is a section through the panel with the condenser mounted thereon, Figs. 6 and 7 are side views of a modification of the fastener, and Fig. 8 is an end view of the modification.

The condenser has a tubular plastic dielectric 1 pressed or molded into a metal sleeve 2 carrying a terminal 3. The bore of the plastic tube is threaded to receive a metal screw 4. The capacity of the resultant condenser is determined by the thickness of the plastic tube and by the length of the screw 4 lying within the metal sleeve 2.

The plastic tube 1 projects a substantial distance beyond the terminal sleeve 2 and on the projecting end is fixed a ferrule 5 having a flared end 6 from which project arms 7 having the outer ends thereof bent inwardly so as to be normally spaced apart a distance less than the outside diameter of the screw 4. The outer ends of the arms 7 in effect provide cam surfaces cooperating with the screw to produce a spreading, gripping action on the arms.

In the mounting of the condenser the flared end 6 abuts against a panel 8 around a circular clearance opening 9 of larger diameter than the screw 4 but of smaller diameter than the flared end 6. The arms 7 project through notches 10. Upon threading the screw into the sleeve 1, the inner end of the screw engages the cam surfaces on the arms 7 and forces the arms 7 apart thereby tightly fastening the trimmer condenser to the panel. The length of the screw is such that the arms 7 are spread apart to clamp the trimmer condenser in place before the outer end of the screw enters the metal sleeve 2. Under this condition the trimmer condenser has the maximum capacity. The capacity of the trimmer is adjusted by threading the screw further into the sleeve 1 so that a smaller part of the screw lies within the metal sleeve 2. Throughout this adjustment there is no change in the clamping action.

In Figs. 6, 7, and 8 is shown a slightly different clamping arrangement which otherwise uses the same constructions previously described. In the Fig. 6-8 construction a metal ferrule 5a is pressed on the projecting end of the tube 1 of plastic. The ferrule has arms 7a which, like the arms 7 in the previously described construction, are received in notches 10 in the panel 8. The arms 7a have bowed sections 11 adjacent the panel and have inwardly extending ends 12 which are normally spaced apart a distance smaller than the diameter of the screw 4. When the screw engages the ends 12, the arms 7a are forced apart and the bowed sections 11 are pressed into gripping engagement with the rear side of the panel 8 adjacent the notches 10.

The ferrule 5a may have arms 13 having inwardly extending ends 14 which engage the screw threads and provide a positive drive for the screw. The arms 13 are resilient and provide a firm mechanical and electrical contact with the screw threads. With arms 13, it is not necessary that the bore of the tube 1 be threaded.

The mounting arrangement is not limited to trimmer condensers. Other devices having screw adjustment can be similarly mounted.

In trimmer condensers it is important that the adjustable element be rigidly held in position after adjustment, so as not to change its setting by accidental contact by some other object or by vibration. Also this is necessary to prevent microphonic action of the trimmer due to jarring or vibration. In this invention the necessary firm gripping of the adjustment screw is automatically obtained at no additional cost by the device which locks the trimmer in the chassis.

What I claim as new is:

A trimmer condenser assembly comprising a dielectric tube, an outer electrode on one end of the tube, a screw in the tube having an end extending out said one end of the tube, the portion thereof lying within the projected area of the outer electrode serving as the inner electrode, a ferrule on the outside of the other end of the tube spaced from the outer electrode, arms projecting radially and axially outward from the ferrule and having portions thereof normally spaced apart less than the diameter of the screw whereby the arms are spread apart as the screw is threaded through the tube, and a support against which the tube abuts, said support having a clearance opening for the screw and notches for receiving the arms into which the arms are spread to anchor the condenser to the support, and said gripping arms in unspread position fitting in said notches and non-rotatably anchoring the tube.

JEROME D. HEIBEL.

REFERENCES CITED

The following references are of record in the file of this patent:

UNITED STATES PATENTS

| Number | Name | Date |
|---|---|---|
| 1,031,462 | Paine | July 2, 1912 |
| 2,108,398 | Allen | Feb. 15, 1938 |
| 2,141,892 | Wilson | Dec. 27, 1938 |
| 2,244,977 | Hansman | June 10, 1941 |
| 2,314,770 | Cogswell | Mar. 23, 1943 |
| 2,386,732 | Wohlhieter | Oct. 9, 1945 |
| 2,477,688 | Dyer | Aug. 2, 1949 |
| 2,504,758 | Thias | Apr. 18, 1950 |

FOREIGN PATENTS

| Number | Country | Date |
|---|---|---|
| 647,016 | France | July 23, 1928 |
| 540,279 | Great Britain | Oct. 10, 1941 |